US010533102B2

(12) United States Patent
Mersch et al.

(10) Patent No.: US 10,533,102 B2
(45) Date of Patent: Jan. 14, 2020

(54) PREPARATION OF MATT PAINTS AND PRINTING INKS

(71) Applicant: Kronos International, Inc., Leverkusen (DE)

(72) Inventors: Frank Mersch, Leichlingen (DE); Volker Juergens, Kirchhundem (DE)

(73) Assignee: Kronos International, Inc., Leverkusen (DE)

( * ) Notice: Subject to any disclaimer, the term of this patent is extended or adjusted under 35 U.S.C. 154(b) by 390 days.

(21) Appl. No.: 15/421,584

(22) Filed: Feb. 1, 2017

(65) Prior Publication Data

US 2017/0218210 A1 Aug. 3, 2017

(30) Foreign Application Priority Data

Feb. 2, 2016 (EP) .................................... 16000253

(51) Int. Cl.
| | | |
|---|---|---|
| *C09D 7/65* | (2018.01) | |
| *C09D 7/42* | (2018.01) | |
| *C09D 7/62* | (2018.01) | |
| *C09D 11/322* | (2014.01) | |
| *C09D 11/02* | (2014.01) | |
| *C09C 1/24* | (2006.01) | |
| *C09C 1/36* | (2006.01) | |
| *C09C 3/06* | (2006.01) | |
| *C09C 3/08* | (2006.01) | |
| *C09C 3/12* | (2006.01) | |
| *C09D 7/40* | (2018.01) | |
| *C08K 3/22* | (2006.01) | |
| *C08K 9/02* | (2006.01) | |
| *C08K 9/06* | (2006.01) | |
| *C08K 9/04* | (2006.01) | |

(52) U.S. Cl.
CPC .............. *C09D 7/68* (2018.01); *C09C 1/24* (2013.01); *C09C 1/3653* (2013.01); *C09C 1/3661* (2013.01); *C09C 1/3669* (2013.01); *C09C 1/3684* (2013.01); *C09C 1/3692* (2013.01); *C09C 3/063* (2013.01); *C09C 3/08* (2013.01); *C09C 3/12* (2013.01); *C09D 7/42* (2018.01); *C09D 7/62* (2018.01); *C09D 7/69* (2018.01); *C01P 2004/53* (2013.01); *C01P 2004/61* (2013.01); *C01P 2004/62* (2013.01); *C08K 9/02* (2013.01); *C08K 9/04* (2013.01); *C08K 9/06* (2013.01); *C08K 2003/2241* (2013.01); *C08K 2201/003* (2013.01)

(58) Field of Classification Search
None
See application file for complete search history.

(56) References Cited

U.S. PATENT DOCUMENTS

| | | | |
|---|---|---|---|
| 6,103,004 A | 8/2000 | Belligoi et al. | |
| 8,858,701 B2* | 10/2014 | Wilkenhoener | C09C 1/3653 106/449 |
| 10,160,862 B2* | 12/2018 | Juergens | C01G 23/0532 |
| 2004/0177789 A1 | 9/2004 | Heider et al. | |
| 2006/0051304 A1* | 3/2006 | Peng | A61K 8/26 424/59 |
| 2010/0288164 A1* | 11/2010 | Schubert | C01B 33/193 106/270 |
| 2012/0142837 A1* | 6/2012 | Garcia | C01B 33/18 524/188 |
| 2012/0282311 A1* | 11/2012 | Schmid | C09C 1/0021 424/401 |
| 2013/0202879 A1* | 8/2013 | Gane | C08K 3/26 428/330 |
| 2015/0148470 A1 | 5/2015 | Cottrell et al. | |
| 2015/0210867 A1* | 7/2015 | Fujiwara | C09D 5/22 428/328 |
| 2015/0240049 A1* | 8/2015 | Hiorns | D21H 19/38 106/464 |
| 2015/0247040 A1* | 9/2015 | Henglein | C09D 7/70 106/483 |
| 2015/0302947 A1 | 10/2015 | Wang | |
| 2017/0121551 A1* | 5/2017 | Siekman | C09D 1/00 |
| 2018/0051175 A1* | 2/2018 | Werner | D21H 17/675 |

FOREIGN PATENT DOCUMENTS

| | | |
|---|---|---|
| DE | 19516253 | 10/1996 |
| EP | 1398301 | 3/2004 |
| GB | 2372253 A * | 8/2002 |
| WO | 2014158018 | 10/2014 |
| WO | WO 2017/071805 A1 * | 5/2017 |

OTHER PUBLICATIONS

EPO Search Report for EP 16000253, dated Jun. 14, 2016; 2 pages.*
PCT Search Report for PCT/EP2017/000098, dated Mar. 31, 2017; 3 pages.*
Written Opinion of the International Search Authority for PCT/EP2017/000098, dated Aug. 7, 2018; 7 pages.*
Siekman et al., Malting Agent and Method for Obtaining the Same, U.S. Appl. No. 15/337,044, filed Oct. 28, 2016 (U.S. counterpart to EP 15003103 referenced in specification for U.S. Appl. No. 15/421,584).

* cited by examiner

*Primary Examiner* — Helene Klemanski
(74) *Attorney, Agent, or Firm* — Locke Lord LLP

(57) ABSTRACT

The invention relates to a pigment composition for preparing pigmented matt coatings, such as matt paints and printing inks. Further, the invention relates to a process for preparing such pigment composition, and to a coating formulation containing such composition. Finally, the invention is directed to a pigmented matt surface of a substrate, and to the use of the pigment compositions disclosed herein for matting substrates.

38 Claims, No Drawings

PREPARATION OF MATT PAINTS AND PRINTING INKS

RELATED APPLICATIONS

This application claims the benefit of Patent App. No. EP 16000253.1 filed Feb. 2, 2016.

BACKGROUND

Field of the Invention

The invention relates to a pigment composition for preparing pigmented matt coatings, such as matt paints and printing inks. Further, the invention relates to a process for preparing such pigment composition, and to a coating formulation containing such composition. Finally, the invention is directed to a pigmented matt surface of a substrate, and to the use of the pigment compositions disclosed herein for matting substrates.

Technological Background of the Invention

Matting a surface is achieved by selectively roughening or contouring the surface in the micro range. Thus, impinging light is no longer reflected directionally, but diffusely. The height, shape and number of the surface structures determine the degree of gloss of the paint film or printing ink.

Specific matting agents are usually added to the paint or printing ink composition to achieve a mat surface. The usual matting agents are spherical particles with a particle size within a range of from 1 to about 20 μm, as a function of the film layer thickness. In practice, precipitated or pyrogenic silicas or silica gels are predominantly used as matting agents, but also matting agents based on duromers, waxes, or thermoplasts are used. Further known is the suitability of silicates, calcium carbonate, and different kinds of hollow spheres.

EP 1 398 301 B1 discloses matting agents for paints and lacquers based on precipitated silicas having particle sizes (d50) within a range of from 5 to 15 μm and a specific surface (BET) of from 350 to 550 $m^2/g$. The silicas are optionally coated with wax.

DE 195 16 253 A1 discloses matting agents based on spray-dried silica gel. In order to ensure sufficient stability of the aggregates, a binder, such as a layer silicate, pyrogenic silica or organic polymer, is used. The agent has a particle size of from 1 to 20 μm and a specific pore volume of from 0.4 to 2.5 ml/g.

In general, the matting effect increases with the dosage of the matting agent. Larger particles have a greater matting effect, but lead to a less smooth surface, which is undesirable. Further, both higher contents of matting agent and a longer dispersing time result in increasing viscosities of the paint systems, thus creating processing problems. Further, the known matting agents based on silica are difficult to handle because of a strong tendency to dusting, and are therefore disadvantageous.

According to the patent application EP 1 500 3103, these disadvantages are avoided by using pigment agglomerates having a mean size d50 of from 2 μm to 200 μm in the preparation of matt paints and printing inks. The process is characterized in that the pigment agglomerates partially decay during the dispersing, for example, in a bead mill, but no increase of viscosity occurs. A further feature of the process is that the matting agent and the pigment have the same chemical compositions and surface properties. A drawback of the process is that the degree of matting depends significantly on the input of dispersing energy due to the partial decay of the pigment agglomerates. Thus, the matting effect of that process is greatly affected by the dispersing method.

Therefore, there is a need in the art for a matting agent for preparing matt coatings that is little dusting, dispersion-stable, and further reproducibly enables surfaces having a homogeneous matt appearance. Additionally, there is a need for a process for preparing matt pigmented coatings in which the matting agent has the similar composition as the pigment, but the matting effect is not affected by the dispersing method.

BRIEF DESCRIPTION OF THE INVENTION

The technical problem underlying the invention is to provide a pigment composition for preparing pigmented matt coatings, a process for preparing such a composition, and a coating formulation containing such pigment composition, a pigmented matt surface of a substrate (e.g. plastic), and the use of said composition for matting substrates.

The problem is solved by a pigment composition for preparing matt coatings, characterized in that said pigment composition comprises inorganic pigment particles having a bimodal mass-related particle size distribution, in which the first particle fraction has a pigmentary particle size, and in which the second particle fraction has a mean particle size (d50) within a range of from about 2 to about 200 μm, preferably from about 2 to about 100 μm, more preferably from about 2 to about 50 μm, and most preferably from about 2 to about 20 μm, and in which the first and second particle fractions have been preferably subjected to a surface treatment.

The preferred pigment composition according to the invention has good matting properties and an excellent opacity. Further, the preferred composition has a high impact and abrasion resistance, and an improved chemical stability. The incorporation of the preferred composition does not significantly change the matting effect or the viscosity of the coating formulation, as the particles do not decay, so that the formulation is readily prepared and easily handled and applied. Further, only a slight adaptation of the formulation from glossy paints is required because of a similar viscosity and matrix behavior, which makes the composition according to the invention more practicable.

Therefore, in a first aspect, the invention relates to a preferred pigment composition for preparing matt coatings, characterized in, that said pigment composition comprises inorganic pigment particles having a bimodal mass-related particle size distribution, in which the first particle fraction has a pigmentary particle size, and in which the second particle fraction has a mean particle size (d50) within a range of from about 2 to about 200 μm, preferably from about 2 to about 100 μm, more preferably from about 2 to about 50 μm, and most preferably from about 2 to about 20 μm, and in which the first and second particle fractions have been subjected to a surface treatment.

In a further aspect, the invention relates to a process for producing a pigment composition for matt coatings, comprising the steps of:
(a) providing a first inorganic pigment particle fraction with a pigmentary particle size;
(b) providing a second inorganic pigment particle fraction with a mean particle size (d50) within a range of from about 2 to about 200 μm, preferably from about 2 to about 100 μm, more preferably from about 2 to about 50 μm, and most preferably from about 2 to about 20 μm; and (c) subjecting the first and second pigment particle fractions to a surface treatment in aqueous suspension.

In another aspect, the invention relates to a coating formulation comprising the pigment composition according to the invention.

In yet another aspect, the present invention is directed to a pigmented matt surface of a substrate, characterized in that said surface is coated with a coating formulation according to to the invention.

In another aspect, the invention refers to pigmented matt coatings, such as paints and printing inks, characterized in that a pigment composition according to the invention is employed.

In a further aspect, the present invention is directed to a plastic comprising a matting agent, characterized in that said plastic comprises a pigment composition according to the invention.

Finally, in another aspect, the invention relates to the use of a pigment composition for matting substrates.

Further advantageous embodiments of the invention are stated in the dependent claims.

DESCRIPTION OF THE INVENTION

These and further aspects, features, and advantages of the invention become apparent to the skilled person from a study of the following detailed description and claims. Each feature from one aspect of the invention may also be used in any other aspect of the invention and the invention does not require the use of all aspects or the achievement of all objectives at the same time. Further, of course, the examples contained herein are intended to merely describe and illustrate the invention, but not to limit it, and in particular, the invention is not limited to such examples. Numerical ranges stated in the form "from x to y" include the values mentioned and those values that lie within the range of the respective measurement accuracy as known to the skilled person. If several preferred numerical ranges are stated in this form, of course, all the ranges formed by a combination of the different end points are also included. The use of the term about is intended to encompass all values that lie within the range of the respective measurement accuracy known to the skilled person.

All percentages stated in connection with the compositions herein described relate to percent by weight unless explicitly stated otherwise, respectively based on the mixture or composition in question.

"At least one" as used herein means 1 or more, i.e., 1, 2, 3, 4, 5, 6, 7, 8, 9, or more. With respect to an ingredient, the value relates to the species of the ingredient rather than the absolute number of molecules. Together with weight statements, the value relates to all compounds of the stated kind that are contained in the composition/formulation, which means that the composition/formulation does not contain any further compounds of this kind beyond the stated amount of the corresponding compounds.

Within the scope of the invention, the "mean particle size" means the mass-related median d50, hereinafter d50. The particle size distribution and the mass-related median d50 were determined by sedimentation techniques as described herein.

"Pigment", as used herein, relates to inorganic or organic colorants that are virtually insoluble in the application medium according to DIN 55 943, which are neither chemically nor physically changed in the application medium and retain their particulate structure. They are employed for coloring, which is based on the interaction of the pigment particles with the visible light by absorption and remission. Further, "pigmentary particle size", as used herein, refers to an average particle size (d50) within a range of from about 0.01 to about 1 µm, preferably from about 0.2 to 0.5 µm, and more preferably from about 0.2 to about 0.4 µm.

Any inorganic pigment known in the prior art and suitable for the purpose according to the invention can be employed as said inorganic pigment particle. Preferably, said inorganic pigment particle is a metal salt, and more preferably, said metal salt is a metal oxide.

Suitable inorganic pigments include, without limitation, white pigments, such as titanium dioxide (C.I. Pigment White 6), zinc white, leaded zinc oxide; zinc sulfide, lithopone; black pigments, such as iron oxide black (C.I. Pigment Black 11), iron manganese black, spinel black (C.I. Pigment Black 27); carbon black (C.I. Pigment Black 7); color pigments, such as chromium oxide, chromium oxide hydrate green; chromium green (C.I. Pigment Green 48); cobalt green (C.I. Pigment Green 50); ultramarine green; cobalt blue (C.I. Pigment Blue 28 and 36; C.I. Pigment Blue 72); ultramarine blue; manganese blue; ultramarine violet; cobalt and manganese violet; iron oxide red (C.I. Pigment Red 101); cadmium sulfoselenide (C.I. Pigment Red 108); cerium sulfide (C.I. Pigment Red 265); molybdate red (C.I. Pigment Red 104); ultramarine red; iron oxide brown (C.I. Pigment Brown 6 and 7), mixed brown, spinel and corundum phases (C.I. Pigment Brown, 29, 31, 33, 34, 35, 37, 39 and 40), chromium titanium yellow (C.I. Pigment Brown 24), chromium orange; cerium sulfide (C.I. Pigment Orange 75); iron oxide yellow (C.I. Pigment Yellow 42); nickel titanium yellow (C.I. Pigment Yellow 53; C.I. Pigment Yellow 157, 158, 159, 160, 161, 162, 163, 164 and 189); chromium titanium yellow; spinel phases (C.I. Pigment Yellow 119); cadmium sulfide and cadmium zinc sulfide (C.I. Pigment Yellow 37 and 35); chromium yellow (C.I. Pigment Yellow 34), and bismuth vanadate (C.I. Pigment Yellow 184).

Further, inorganic pigment particles that are conventionally used as fillers, such as aluminum oxide, aluminum hydroxide, zinc sulfide, natural and precipitated chalk and barium sulfate, may also be employed.

Preferably, the pigment particle is selected from the group consisting of magnesium carbonate, barium sulfate, titanium dioxide, zinc oxide, zinc sulfide, huntite, lead white, lithopone, cristobalite, china clay, and mixtures thereof. Among all pigment particles disclosed herein, titanium dioxide is most preferred because of its pigment properties and its high Mohs hardness. Titanium dioxide may be present in the crystal structures of rutile, anatase or brookite, usually in the crystal structures of rutile or anatase. Rutile is particularly suitable as compared to anatase because of its lower photolytic catalytic activity.

In the case where titanium dioxide is used, untreated titanium dioxide particles (titanium dioxide base pigment), usually prepared by the sulfate or chloride process, are used as the starting material for the first particle fraction according to the invention. Pigmentary titanium dioxide base pigment usually has a mean particle size d50 of from about 0.01 to about 1 µm, preferably from about 0.2 to about 0.5 µm, and more preferably from about 0.2 to about 0.4 µm. A non-pigmentary coarse titanium dioxide base pigment having a mean particle size d50 of from about 2 to about 200 µm, preferably from about 2 to about 100 µm, more preferably from about 2 to about 50 µm, and most preferably from about 2 to about 20 µm, is employed as said second particle fraction. For example, said coarse titanium dioxide base pigment may be a rutile prepared by the sulfate or chloride process. The particles may have a particle size d50 of up to about 2 mm and are optionally ground to the desired particle size range, optionally followed by classification, for example, by screening. The grinding may be effected, for example, in an agitator bead mill, pendulum mill, or roller mill. In a titanium dioxide production by the sulfate process, the desired particle size is achieved during calcination by the addition of particular additives, by longer calcination times and/or higher calcination temperatures. The particles produced are characterized by stronger sintering, and therefore, they are very stable during the subsequent dispersion within the scope of application in coatings, i.e., they do not decay. In a particular embodiment, titanium dioxide particles from a chloride process subjected to a sintering process may be employed.

Preferably, the pigment particles of the coating substances have been surface-treated with compounds of aluminum, silicon, titanium, zirconium, tin, cerium or phosphorus, and/or with organic compounds selected from the group of silanes, siloxanes, trimethylolpropanes (TMPs), trimethylolethanes (TMEs), and hexametaphosphates (HMPs).

Further, in a preferred embodiment of the invention, the first and second particle fractions have been subjected to the same surface treatment. In this way, both particle fractions have approximately identical surface properties, such as matrix compatibility, especially towards surface-active additives, so that their manageability is significantly improved.

Preferably, the second particle fraction is present in the pigment composition in an amount of from about 1 to about 10% by weight, more preferably from about 1 to about 8% by weight, more preferably from about 1 to about 6% by weight, and most preferably from about 3 to about 6% by weight based on the total weight of the pigment composition.

The process according to the invention for producing a pigment composition for matt coatings comprises the steps of:
(a) providing a first inorganic pigment particle fraction with a pigmentary particle size, preferably from about 0.2 to about 0.5 µm, and more preferably from about 0.2 to about 0.4 µm;
(b) providing a second inorganic pigment particle fraction with a mean particle size (d50) within a range of from about 2 to about 200 µm, preferably from about 2 to about 100 µm, more preferably from about 2 to about 50 µm, and most preferably from about 2 to about 20 µm; and
(c) subjecting the first and second pigment particle fractions to a surface treatment in aqueous suspension.

In titanium dioxide production by the sulfate process, the desired particle size is achieved during calcination by the addition of particular additives, by longer calcination times and/or higher calcination temperatures. The particles produced are characterized by stronger sintering, and therefore, they are very stable during the subsequent dispersion within the scope of application in coatings, i.e., they do not decay. In a particular embodiment, titanium dioxide particles from a chloride processsubjected to a sintering process may be employed.

Subsequently, the pigment particles are surface-treated with inorganic and/or organic compounds. The surface treatment corresponds to the surface coating usually applied with pigments. The coating substances include, for example, Si, Al, Ti, Zr, Sn, Ce, or P compounds, or organic compounds, such as silanes, siloxanes, trimethylolpropane (TMP), trimethylolethane (TME), hexametaphosphate (HMP), etc. In this way, the matting agent has similar surface properties as a usually employed pigment, for example, in terms of matrix compatibility, especially towards surface-active additives.

In the surface treatment, one or more layers or mixed layers of the coating substances may be applied. In a particular embodiment of the invention, the outer layer of the surface-treated particle contains Al compounds, especially aluminum oxide or water-containing aluminum oxide. The surface treatment is performed, for example, by precipitating the coating substances onto the particles in aqueous suspension. These methods are known, in particular, from titanium dioxide pigment technology, and can be applied according to the invention. The layer thickness of the surface coating applied to the particles within the scope of the surface treatment is within the nanometer range, preferably smaller than about 10 nm, more preferably from about 1 nm to about 10 nm, so that the particle size of the surface-treated particles does not change significantly as compared to the untreated particles.

The surface treatment of both particle fractions is preferably effected in the same way by either treating both particle fractions together in the same suspension, or by treating each particle fraction separately in a suspension each. In the first case, a suspension of both particle fractions with a proportion of the second particle fraction of from about 1 to about 10% by weight, preferably from about 1 to about 8% by weight, preferably from about 1 to about 6% by weight, and most preferably from about 3 to about 6% by weight, based on the total particle weight, is prepared. Subsequently, the particles are surface-treated in the suspension and separated off, washed and dried as usual, and micronized as usual. In the second case, each particle fraction is surface-treated separately in a suspension, then separated off, washed, dried, micronized, and finally mixed in a dry state in the desired quantitative ratio.

Subsequently to the surface treatment, the particles are separated off, filtered, washed and dried, and optionally micronized, for example, in a steam jet mill. The micronization is usually effected through a steam jet mill, in the course of which an organic compound, such as TMP or TME, may be added. Those skilled in the art are aware of such methods.

The present invention further relates to coating formulations for preparing pigmented matt surfaces, containing the pigment composition as described herein. The composition may be contained in the coating formulation in an amount of from about 0.1 to about 98% by weight, preferably from about 1 to about 50% by weight, more preferably from about 2 to about 25% by weight, most preferably from about 3 to about 23% by weight, based on the total weight of the coating formulation. In addition to the pigment composition according to the invention, the formulation may have a usual pigment composition, and pigments. Preferably, the formulation does not contain any further pigment compositions.

Further, the coating formulation comprises usual components. Any components known in the prior art that are suitable for the purpose according to the invention may be employed as components. Preferably, the formulation comprises at least one component selected from the group consisting of a binder, defoamer, dispersant, filler, solvent, preservative, auxiliary film forming agent, and rheology additive. The preservatives also include usual fungicides. The coating formulations include lacquers, paints, and printing inks.

The present invention further relates to pigmented matt surfaces of a substrate, wherein said surface is characterized in that said surface is coated with a coating formulation as disclosed herein. The formulations may be in the form of the established one-part, two-part, and multicomponent paints in the usual compositions. The paints are applied to the substrate by the usual techniques, and methods, and cured as a function of the paint composition, especially the binder, for example, by means of UV irradiation or drying. The substrates include without limitation wood, plastics, metals, paper, glass fabric, and mixtures thereof.

In the finished coating, the first, pigmentary pigment particle fraction (first particle fraction) provides for pigmentation, and the second, coarser pigment particle fraction (d50 within a range of from about 2 to about 200 µm) provides for the sought surface roughness.

The invention still further relates to a plastic characterized in that said plastic comprises a pigment composition according to the invention. Any plastic known in the prior art and suitable for the purpose according to the invention can be employed as the plastic. "Plastic", as used herein, relates to a material containing at least 50% by weight of a polymer, based on the total weight of the plastic. Said polymer may be a homopolymer, a copolymer, or a grafted polymer. Further, the polymer may be an atactic, isotactic, or syndiotactic polymer. Further, the plastic is a thermoplast, elastomer, duroplast or thermoplastic elastomer, preferably a thermoplast. Without limitation, the polymer is selected from the group consisting of polyolefins, polystyrene, polyamide, polyketone, polyester, polyurethane, poly(meth) acrylate, and mixtures thereof. Without limitation, the polyolefin is selected from the group consisting of polymethylene, polyethylene, polypropylene, polybutylene, and mixtures thereof. The composition according to the invention can be incorporated in the plastic by known techniques and methods, for example, by extruding. The composition described herein is advantageous in the extruding process, in particular, because it does not decay therein, and the extruding has no influence on the matting effect. The matting agent is processed into the plastic in the usual amounts. Thus, the plastic obtained contains from about 0.1 to about 30% by weight, preferably from about 1 to about 25% by weight, of the agent according to the invention, based on the total weight of the plastic.

Finally, the invention further relates to the use of a pigment composition for matting substrates. As described above, the substrates include without limitation wood, plastics, metals, paper, glass fabric, and mixtures thereof.

Test Methods
Particle Size Distribution and Mass-related Median d50

This method uses the concentration shift of a suspension of particles in water, which sediments by effecting of gravity, for the calculation of its particle size distribution. The change of concentration was detected by means of x-ray. The decrease in the intensity of the x-ray beam due to absorption by the particles is a measure of the degree of the solid concentration in the beam path. The calculation of the particle size is based on the laws of Stokes out of the fixed sedimentation rates of the particles.

Flow Viscosity

The flow viscosity was determined by using the method DIN 53211. The finished paint is poured into a flow cup of defined geometry with 4 mm diameter outlet capillary. When the outlet is opened, the fluid flows through the central outlet opening in the bottom of the cup under its own weight. The flow time is measured by optical scanning of the emerging fluid stream using Cuptimer 243 T automatic flow time measuring station, the measured time being immediately displayed on the unit.

Contrast Ratio

The contrast ratio was measured by standard technique using apparatus Color guide sphere from Byk gardner and foil Hostaphan RNK 23 commercially available from Jakob Benn & Söhne.

EXAMPLE 1a

A coarse grain, non-pigmentary titanium dioxide was sintered in a kiln. The sintered material (220 g) was grinded and the particle size was classified by the Atterberg sedimentation technique. The obtained aggregates had a particle size d50m of 17 (+/−2) µm. This fraction was post-treated with an alumina layer. The amount of alumina was calculated to provide a similar layer thickness to the Kronos 2066 white pigment used in the remainder of the examples.

EXAMPLE 1b

Example 1 b was prepared in the same manner as Example 1a, except that no post treatment was conducted.

EXAMPLE 2

A standard nitro cellulose coating formulation is prepared by dissolving chips of nitro cellulose in ethanol and ethyl acetate. Other components included plasticizers, and additives for improving the surface and gloss. After preparing the vehicle and weighting in the pigment composition the formulation is dispersed in a Skandex disperser using milling beads. The particular pigment composition used is set forth below with respect to the Comparative Examples 1 through 3 and Examples 4 through 6.

COMPARATIVE EXAMPLE 1

Comparative Example 1 includes the preparation of the standard formulation as described in Example 2, wherein the pigment composition is titanium dioxide pigment in the rutile crystal modification, commercially available under the product name Kronos 2066 from Kronos International Inc., which is post-treated with alumina. The flow viscosity and the gloss (20°, 60°, 85°) were determined as described above. The data can be seen from Table 1.

COMPARATIVE EXAMPLE 2

Comparative Example 2 includes the preparation of the standard formulation as described in Example 2, wherein the pigment composition is titanium dioxide pigment (97 wt. % based on the total amount of said pigment composition) in the rutile crystal modification, commercially available under the product name Kronos 2066 from Kronos International Inc., which is post-treated with alumina, and a commercially available matting agent Acematt TS100 (3 wt. % based on the total amount of said pigment composition). The flow viscosity and the gloss (20°, 60°, 85°) were determined as described above. The data can be seen from Table 1.

COMPARATIVE EXAMPLE 3

Comparative Example 5 includes the preparation of the standard formulation as described in Example 2, the pigment composition is titanium dioxide pigment (94 wt. % based on the total amount of said pigment composition) in the rutile crystal modification, commercially available under the product name Kronos 2066 from Kronos International Inc., which is post-treated with alumina, and commercially available matting agent Acematt TS100 (6 wt. % based on the total amount of said pigment composition). The flow viscosity and the gloss (20°, 60°, 85°) were determined as described above. The data can be seen from Table 1.

EXAMPLE 3

Example 3 includes the preparation of the standard formulation as described in Example 2, the pigment composition is titanium dioxide pigment (97 wt. % based on the total amount of said pigment composition) in the rutile crystal modification, commercially available under the product name Kronos 2066 from Kronos International Inc., which is post-treated with alumina, and the material of Example 1 b (3 wt. % based on the total amount of said pigment composition). The flow viscosity and the gloss (20°, 60°, 85°) were determined as described above. The data can be seen from Table 1.

EXAMPLE 4

Example 4 includes the preparation of the standard formulation as described in Example 2, the pigment composition is titanium dioxide pigment (94 wt. % based on the total amount of said pigment composition) in the rutile crystal modification, commercially available under the product name Kronos 2066 from Kronos International Inc., which is post-treated with alumina, and the material of Example 1 b (6 wt. % based on the total amount of said pigment composition). The flow viscosity and the gloss (20°, 60°, 85°) were determined as described above. The data can be seen from Table 1.

EXAMPLE 5

Example 5 includes the preparation of the standard formulation as described in Example 2, the pigment composition is titanium dioxide pigment (97 wt. % based on the total amount of said pigment composition) in the rutile crystal modification, commercially available under the product name Kronos 2066 from Kronos International Inc., which is post-treated with alumina, and the material of Example 1a (3 wt. % based on the total amount of said pigment composition). The flow viscosity and the gloss (20°, 60°, 85°) were determined as described above. The data can be seen from Table 1.

EXAMPLE 6

Example 6 includes the preparation of the standard formulation as described in Example 2, the pigment composition is titanium dioxide pigment (94 wt. % based on the total amount of said pigment composition) in the rutile crystal modification, commercially available under the product name Kronos 2066 from Kronos International Inc., which is post-treated with alumina, and the material of Example 1a (6 wt. % based on the total amount of said pigment composition). The flow viscosity and the gloss (20°, 60°, 85°) were determined as described above. The data can be seen from Table 1.

TABLE 1

|  | Gloss 20° | Gloss 60° | Gloss 85° | Viscosity [s] | Contrast ratio [%] |
|---|---|---|---|---|---|
| Comparative Example 1 | 47 | 84 | 98 | 45 | 61.8 |
| Comparative Example 2 | 4 | 29 | 68 | 51 | 60.8 |
| Comparative Example 3 | 1 | 9 | 29 | 57 | 59.4 |
| Example 3 | 24 | 62 | 70 | 47 | 61.7 |
| Example 4 | 18 | 56 | 67 | 47 | 61.5 |
| Example 5 | 29 | 68 | 87 | 46 | 61.7 |
| Example 6 | 24 | 62 | 78 | 46 | 61.6 |

As compared to the comparative paints prepared with commercially available titanium dioxide pigment, and additionally with commercially available matting agent (Comparative Examples 2, 3), the paints prepared according to the invention (Examples 3, 4, 5, 6) have a lower viscosity. As compared to the glossy paint prepared with commercially available titanium dioxide that does not contain any matting agent (Comparative Example 1), the mat paints prepared according to the invention (Examples 3, 4, 5, 6) do not show any significant increase in viscosity, but a good matting effect. Further, the paints according to the invention comprising particles, which were subjected to similar post treatment (Examples 5, 6), exhibit improved viscosity properties compared to those paints according to the invention comprising particles, which were not subjected to similar post treatment (Examples 3, 4).

What is claimed is:

1. A pigment composition for preparing matt coatings, comprising:
    inorganic pigment particles having a bimodal mass-related particle size distribution, in which the first particle fraction has a mean particle size (d50) within a range of from about 0.2 to about 0.5 μm, and
    in which the second particle fraction has a mean particle size (d50) within a range of from 2 to 200 μm, and
    in which the first and second particle fractions have been subjected to a surface treatment.

2. The composition of claim 1, wherein the second particle fraction has a mean particle size within a range of from about 2 to about 100 μm.

3. The composition of claim 2, wherein the second particle fraction has a mean particle size within the range of from about 2 to about 20 μm.

4. The composition of claim 1, wherein the first particle fraction has a mean particle size within a range of from about 0.2 to about 0.4 μm.

5. The composition of claim 1, wherein the inorganic pigment particles are a metal salt.

6. The composition of claim 5, wherein the metal salt is a metal oxide.

7. The composition of claim 1, wherein the surface treatment is of a compound selected from the group consisting of aluminum, silicon, titanium, zirconium, tin, cerium or phosphorus, silanes, siloxanes, trimethylolpropanes, trimethylolethanes, hexametaphosphates, and combinations thereof.

8. The composition of claim 1, wherein the first and second particle fractions are subjected to the same surface treatment.

9. The composition of claim 1, wherein the second particle fraction is from about 1 to about 8 weight percent of the total pigment composition.

10. The composition of claim 5, wherein the second particle fraction is from about 3 to about 6 weight percent of the total pigment composition.

11. The composition of claim 1 wherein the inorganic pigment particles are titanium dioxide.

12. The composition of claim 11, wherein the second particle fraction has a mean particle size within a range of from about 2 to about 100 μm.

13. The composition of claim 12, wherein the second particle fraction has a mean particle size within the range of from about 2 to about 20 μm.

14. The composition of claim 11, wherein the first particle fraction has a mean particle size within a range of from about 0.2 to about 0.4 μm.

15. The composition of claim 14, wherein the second particle fraction has a mean particle size within the range of from about 2 to about 100 μm.

16. The composition of claim 15, wherein the second particle fraction has a mean particle size within the range of from about 2 to about 20 μm.

17. The composition of claim 11, wherein the surface treatment is of a compound selected from the group consisting of aluminum, silicon, titanium, zirconium, tin, cerium or phosphorus, silanes, siloxanes, trimethylolpropanes, trimethylolethanes, hexametaphosphates, and combinations thereof.

18. The composition of claim 11, wherein the first and second particle fractions are subjected to the same surface treatment.

19. The composition of claim 11, wherein the second particle fraction is from about 1 to about 8 weight percent of the total pigment composition.

20. The composition of claim 19, wherein the second particle fraction is from about 3 to about 6 weight percent of the total pigment composition.

21. The composition of claim 11, wherein:
the first particle fraction has a mean particle size within a range of from about 0.2 to about 0.4 μm;
the second particle fraction has a mean particle size within the range of from about 2 to about 100 μm;
the second particle fraction is from about 1 to about 8 weight percent of the total pigment composition; and
the first and second particle fractions are subjected to the same surface treatment.

22. The composition of claim 21, wherein the second particle fraction is from about 3 to about 6 weight percent of the total pigment composition.

23. The composition of claim 21, wherein the second particle fraction has a mean particle size within the range of from about 2 to about 20 μm.

24. The composition of claim 1, wherein the composition is further incorporated into a coating formulation for preparing pigmented matt surfaces.

25. The composition of claim 24, wherein the coating formulation is selected from the group consisting of paints and printing inks.

26. The composition of claim 1, wherein the composition is further incorporated into a substrate.

27. The composition of claim 26, wherein the substrate is a plastic.

28. A process for producing a pigment composition for matt coatings, comprising:
(a) providing a first particle fraction of inorganic pigment particles having a mean particle size (d50) within a range of from about 0.2 to about 0.5 μm;
(b) providing a second particle fraction of the inorganic pigment particles having a mean particle size (d50) within a range of from 2 to 200 μm; and
(c) subjecting the first and second particle fractions to a surface treatment in an aqueous suspension.

29. The process of claim 28, wherein the second particle fraction has a mean particle size within the range of from about 2 to about 20 μm.

30. The process of claim 28, wherein the first particle fraction has a mean particle size within a range of from about 0.2 to about 0.4 μm.

31. The process of claim 30, wherein the second particle fraction has a mean particle size within the range of from about 2 to about 20 μm.

32. The process of claim 29, wherein the inorganic pigment particles are a metal salt.

33. The process of claim 32, wherein the metal salt is a metal oxide.

34. The process of claim 28, wherein the surface treatment is of a compound selected from the group consisting of aluminum, silicon, titanium, zirconium, tin, cerium or phosphorus, silanes, siloxanes, trimethylolpropanes, trimethylolethanes, hexametaphosphates, and combinations thereof.

35. The process of claim 28, wherein the first and second particle fractions are simultaneously surface treated in the same aquous suspension.

36. The process of claim 28, wherein the second particle fraction is from about 1 to about 8 weight percent of the total pigment composition.

37. The process of claim 36, wherein the second particle fraction is from about 3 to about 6 weight percent of the total pigment composition.

38. The process of claim 28 wherein the inorganic pigment particles are titanium dioxide.

* * * * *